US008913014B2

(12) United States Patent
Naganawa

(10) Patent No.: US 8,913,014 B2
(45) Date of Patent: Dec. 16, 2014

(54) INFORMATION PROCESSING APPARATUS AND METHOD OF CONTROLLING SAME

(75) Inventor: Yoshihiro Naganawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1346 days.

(21) Appl. No.: 11/850,723

(22) Filed: Sep. 6, 2007

(65) Prior Publication Data

US 2008/0068346 A1     Mar. 20, 2008

(30) Foreign Application Priority Data

Sep. 15, 2006  (JP) ................................ 2006-251413

(51) Int. Cl.
G06F 3/041      (2006.01)
G06F 3/0488     (2013.01)
G06F 3/0354     (2013.01)

(52) U.S. Cl.
CPC .......... G06F 3/0488 (2013.01); G06F 3/03545 (2013.01)
USPC ........... 345/173; 345/157; 345/179; 345/180; 345/182; 345/183; 178/18.01; 178/19.01; 715/790

(58) Field of Classification Search
CPC .............................. G06F 3/0488; G06F 3/4883
USPC ................................. 345/156–167, 173–183; 178/18.01–19.07; 715/700–866
See application file for complete search history.

(56) References Cited

U.S. PATENT DOCUMENTS 5,121,442 A * 6/1992 Togawa et al. ................. 382/189
5,831,612 A * 11/1998 Stoval et al. ................... 715/792
5,844,559 A * 12/1998 Guha ............................ 715/846
6,088,481 A * 7/2000 Okamoto et al. ............. 382/189
6,597,380 B1 * 7/2003 Wang et al. ................... 715/782
7,567,711 B2 * 7/2009 Lin ................................ 382/188
2003/0214491 A1 * 11/2003 Keely et al. ................... 345/179
2006/0061776 A1 * 3/2006 Chen et al. ..................... 358/1.1

FOREIGN PATENT DOCUMENTS

JP    07-037116 A    2/1995
JP    11-249782      9/1999    ............... G06N 3/00

OTHER PUBLICATIONS

Machine translation for JP 7037116.*
Office Action issued on Jul. 22, 2011, in counterpart JPA 2006-251413.

* cited by examiner

Primary Examiner — Michael Pervan
(74) Attorney, Agent, or Firm — Fitzpatrick, Cella, Harper & Scinto

(57) ABSTRACT

An information processing apparatus for data input in which input and editing can be performed through a simple operation is disclosed. The apparatus includes first determination means for determining whether drawing has been completed following input of coordinate data in the drawing mode; second determination means which, if completion of drawing has been determined, is for adopting drawing data, which has been drawn from input of coordinate data until completion of drawing, as a drawing object to be edited, and determining whether this drawing object has a portion that overlaps another object; and control means which, if it has been determined that the drawing object to be edited has a portion that overlaps another object, is for applying control to the drawing object to be edited in such a manner that this drawing object will no longer have a portion that overlaps another object.

18 Claims, 21 Drawing Sheets

F I G. 8
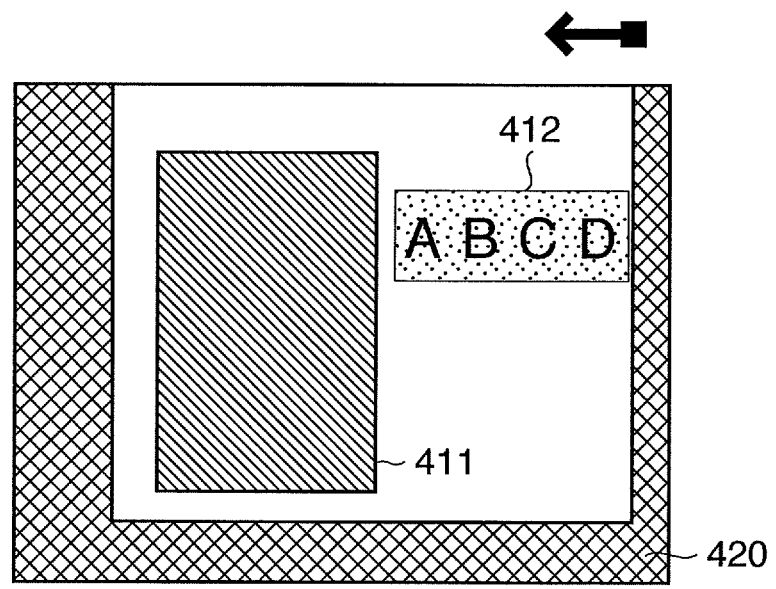

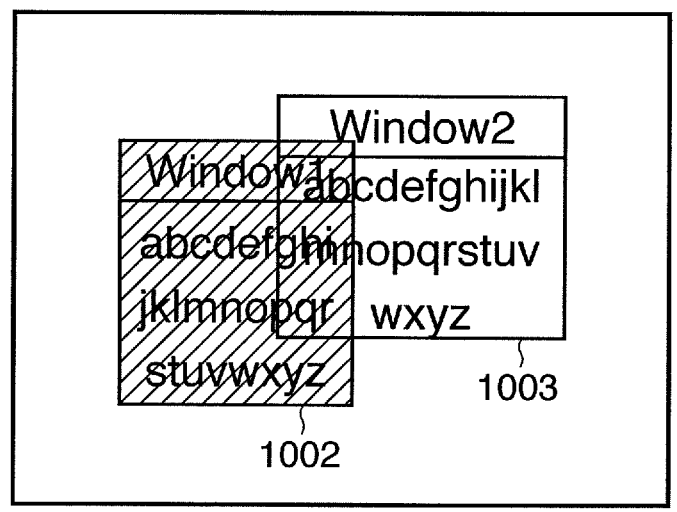
F I G. 10

F I G. 12
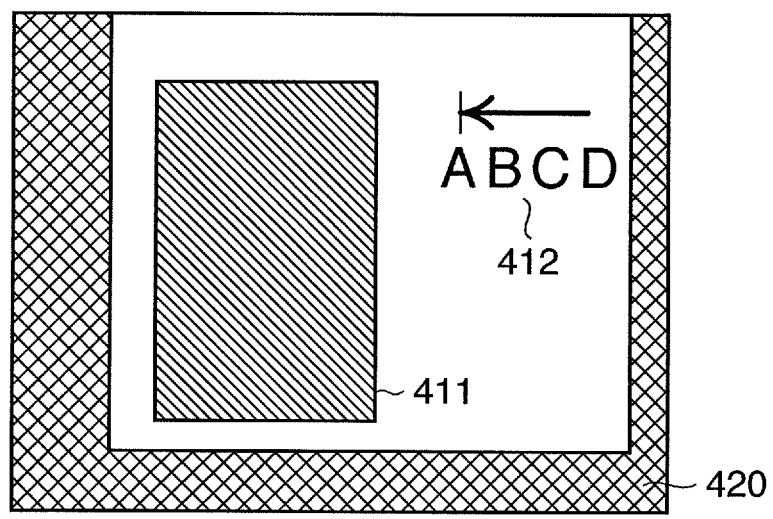

F I G. 14
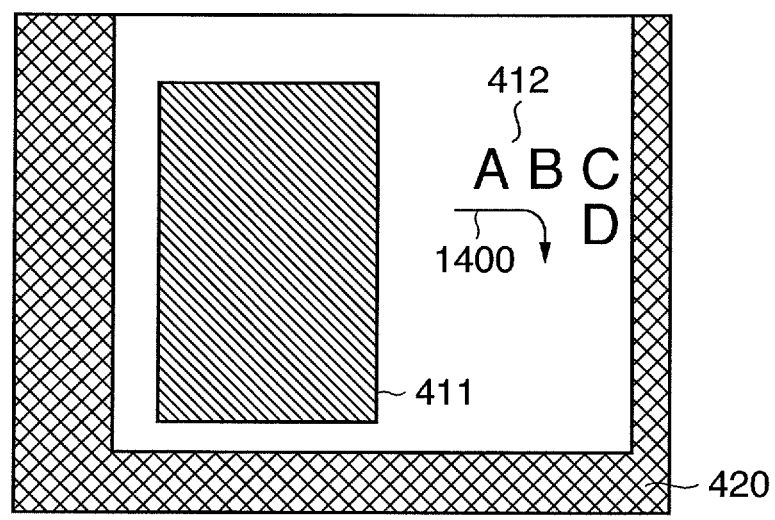

F I G. 15A
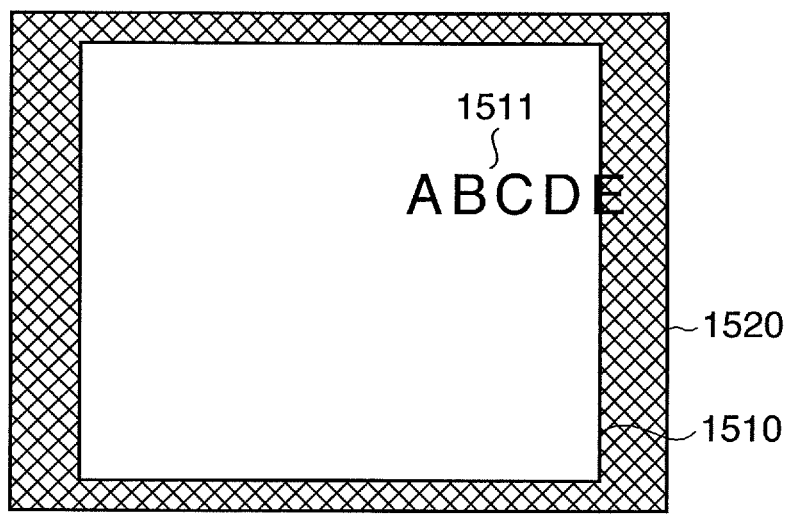

F I G. 16A
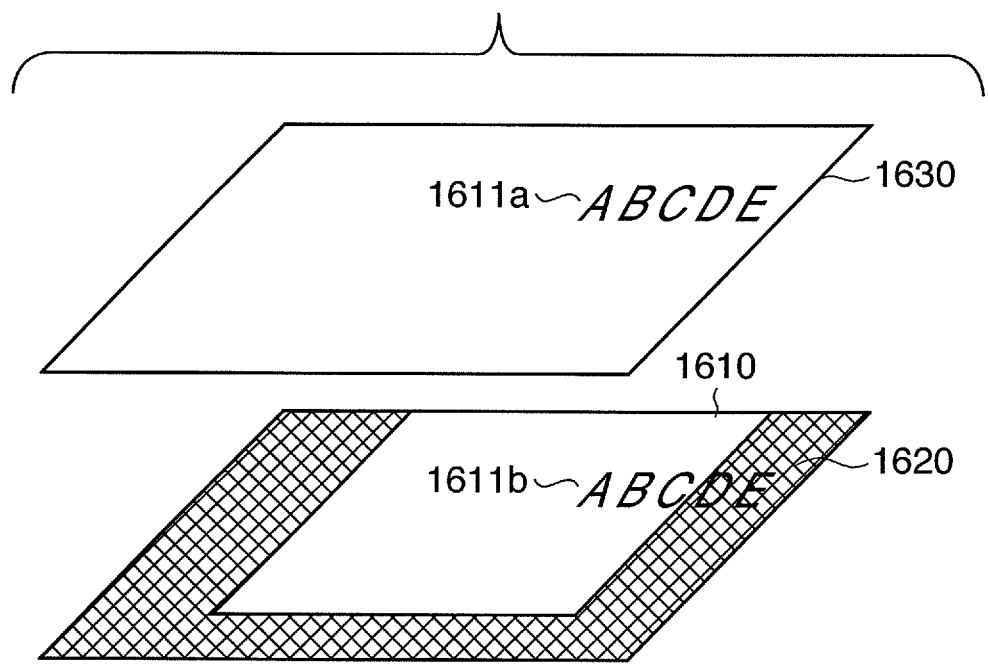

F I G. 16B
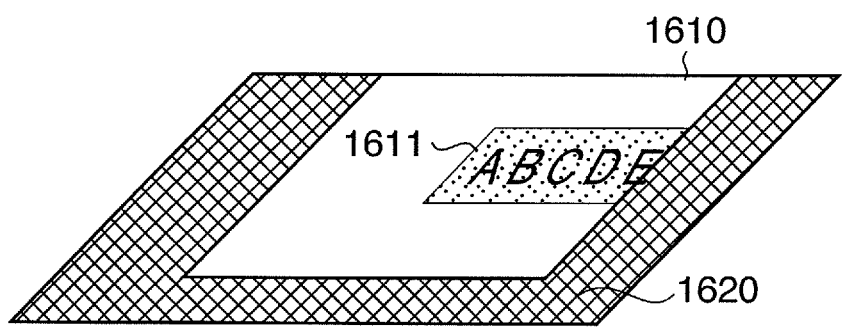

F I G. 17B
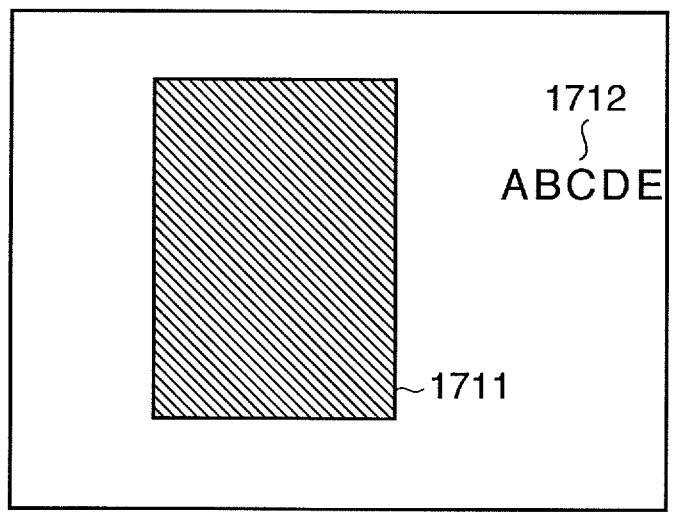

INFORMATION PROCESSING APPARATUS AND METHOD OF CONTROLLING SAME

BACKGROUND OF THE INVENTION

1. Field of the Invention

The present invention relates to a technique for controlling the input of data in an information processing apparatus. More particularly, the invention relates to a technique for controlling input using a digitizer.

2. Description of the Related Art

An information processing apparatus available in the art has a multiwindow-type GUI (Graphical User Interface) and accepts and displays inputs from a user. In such an information processing apparatus, a plurality of windows often are disposed in superimposed fashion in order to display the windows on a display screen of limited size. At such time, as shown for example in FIG. 10, there will be instances where a portion of an input window 1003 that currently is the target of an input is situated in back of another window 1002 already positioned. If an input has been made under these conditions, the portion overlapped by the other input window will be hidden and not visible. Accordingly, in order to make it possible to check the information in the input window in the back, there is a known technique whereby transparency processing is applied to the overlapping portion of the input window in front (e.g., see the specification of Japanese Patent Laid-Open No. 11-249782).

However, the problem set forth below arises in a case where the technique described in the above-mentioned document is applied to an apparatus for accepting and displaying input of a freehand drawing. Specifically, if the other window 1002 is already present in front of the input window 1003, characters that have been written within the window are difficult to see. This makes it necessary to perform a window move operation in order to move the content that has been input on the input window 1003 to a location where it can be easily viewed. Generally, in order to perform a move operation for moving a window or the like, a complicated operation is required. This operation includes switching the apparatus from an input mode to an editing mode, selecting the portion to be edited and moving or changing the size of this portion.

SUMMARY OF THE INVENTION

The present invention has been devised in view of the problems mentioned above and its object is to provide a data input technique in which input and editing are made possible by a simpler operation.

According to one aspect of the present invention, an information processing apparatus having a coordinate input device and a display device and being operable in a drawing mode, in which an image is drawn on the display device based upon coordinate data that is input from the coordinate input device, and in an editing mode for editing an image that has been drawn based upon coordinate data that is input from the coordinate input device, the apparatus comprises a first determination unit for determining whether drawing has been completed following input of coordinate data from the coordinate input device in the drawing mode; a second determination unit which, if completion of drawing has been determined by the first determination unit, is for adopting drawing data, which has been drawn from input of coordinate data from the coordinate input device until completion of drawing, as a drawing object to be edited, and determining whether this drawing object has a portion that overlaps another object; and a control unit which, if the second determination unit has determined that the drawing object to be edited has a portion that overlaps another object, applies control to the drawing object to be edited in such a manner that this drawing object will no longer have a portion that overlaps another object.

According to another aspect of the present invention, a method of controlling an information processing apparatus having a coordinate input device and a display device and being operable in a drawing mode, in which an image is drawn on the display device based upon coordinate data that is input from the coordinate input device, and in an editing mode for editing an image that has been drawn based upon coordinate data that is input from the coordinate input device, the method comprises a first determination step of determining whether drawing has been completed following input of coordinate data from the coordinate input device in the drawing mode; if completion of drawing has been determined at the first determination step, a second determination step of adopting drawing data, which has been drawn from input of coordinate data from the coordinate input device until completion of drawing, as a drawing object to be edited, and determining whether this drawing object has a portion that overlaps another object; and if it has been determined at the second determination step that the drawing object to be edited has a portion that overlaps another object, a control step of applying control to the drawing object to be edited in such a manner that this drawing object will no longer have a portion that overlaps another object.

In accordance with the present invention, a data input technique in which input and editing are made possible by a simpler operation can be provided.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 8 is a diagram exemplifying a state in which a freehand-drawing input object is moved;

FIG. 10 is a diagram exemplifying two windows having overlap;

FIG. 12 is a diagram exemplifying a state in which the spacing between "strokes" constituting a freehand-drawing input object has been narrowed;

FIG. 14 is a diagram exemplifying a state in which a freehand-drawing input has been made while changing direction;

FIGS. 15A and 15B are diagrams illustrating an example of a case where a transparent window has been placed in front of a freehand drawing area;

FIGS. 16A and 16B are diagrams illustrating an example of a case where a freehand drawing window and a display window are different; and FIGS. 17A to 17C are diagrams exemplifying a change in the in-front, in-back relationship between windows at the time of input of a freehand drawing.

DESCRIPTION OF THE EMBODIMENTS

Preferred embodiments of the present invention will now be described in detail with reference to the drawings. It should be noted that these embodiments are for illustrative purposes only and that the scope of the invention is not limited to these embodiments.

(First Embodiment)

An information processing apparatus in which a freehand drawing input made by a user using a pen is accepted by a digitizer will be described below as a first embodiment of an information processing apparatus according to the present invention.

<Structure of Apparatus>

Figure 1:
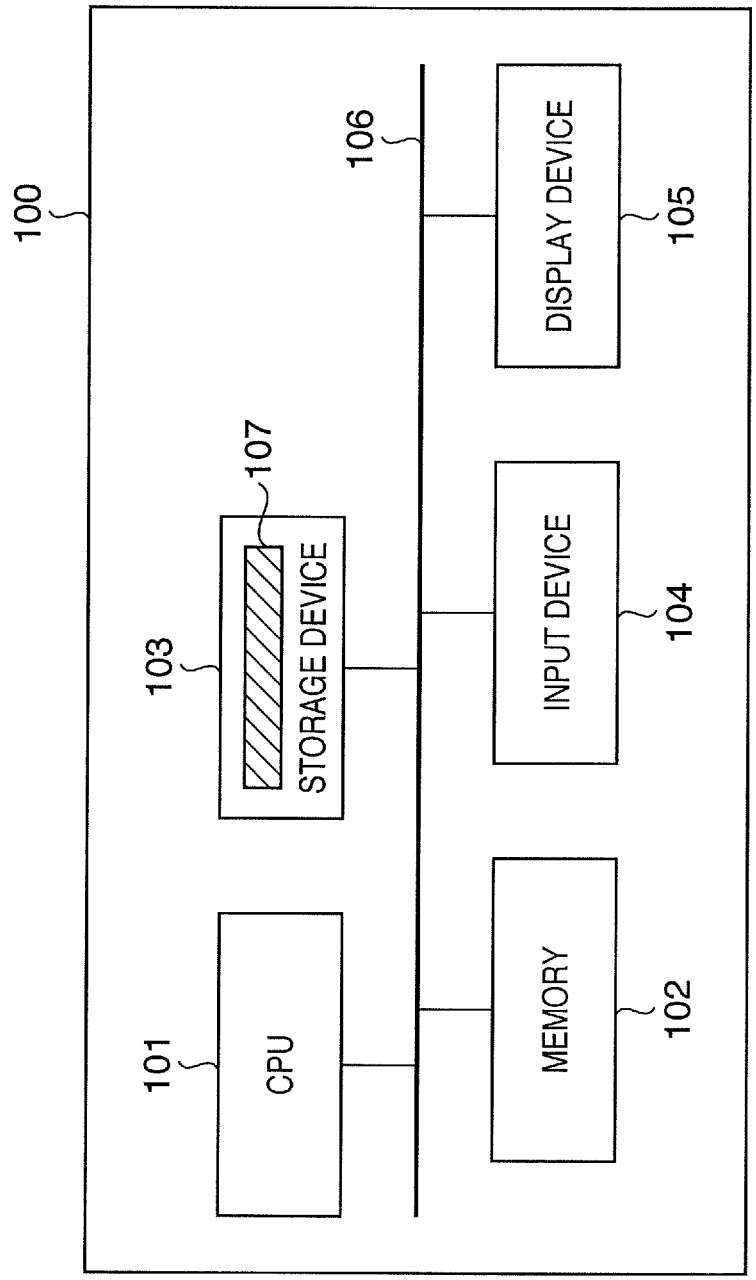
FIG. 1 is a diagram illustrating the internal structure of an information processing apparatus according to a first embodiment of the present invention.

FIG. 1 is a diagram illustrating the internal structure of an information processing apparatus 100 according to a first embodiment. The information processing apparatus 100 includes a CPU 101, a memory 102, a storage device 103, an input device 104 and a display device 105. These are interconnected by a bus 106.

The CPU 101 executes various functions, described below, by running an application program 107 that has been stored in the storage device 103. The memory 102 temporarily stores programs and data that have been read out of the storage device 103 by the CPU 101. The memory 102 is utilized also as an area for the purpose of executing various programs. The storage device 103 stores an operating system, various application programs, a control program and data, etc. Coordinate values, etc., that prevail when a freehand drawing, described below, is input serve as data. Also stored is information (described later) such as input window position and the in-front, in-back relationship of windows. It should be noted that the storage device 103 comprises a large-capacity storage device such as a hard-disk drive.

The input device 104 is a functional unit that accepts an input from a user. Specifically, the input device 104 uses a digitizer 104a, a pen 104b, a keyboard 104c and a mouse 104d, etc. The display device 105 displays information that has been input by the input device 104 and the results of executing the application program by the CPU 101.

Figure 2:
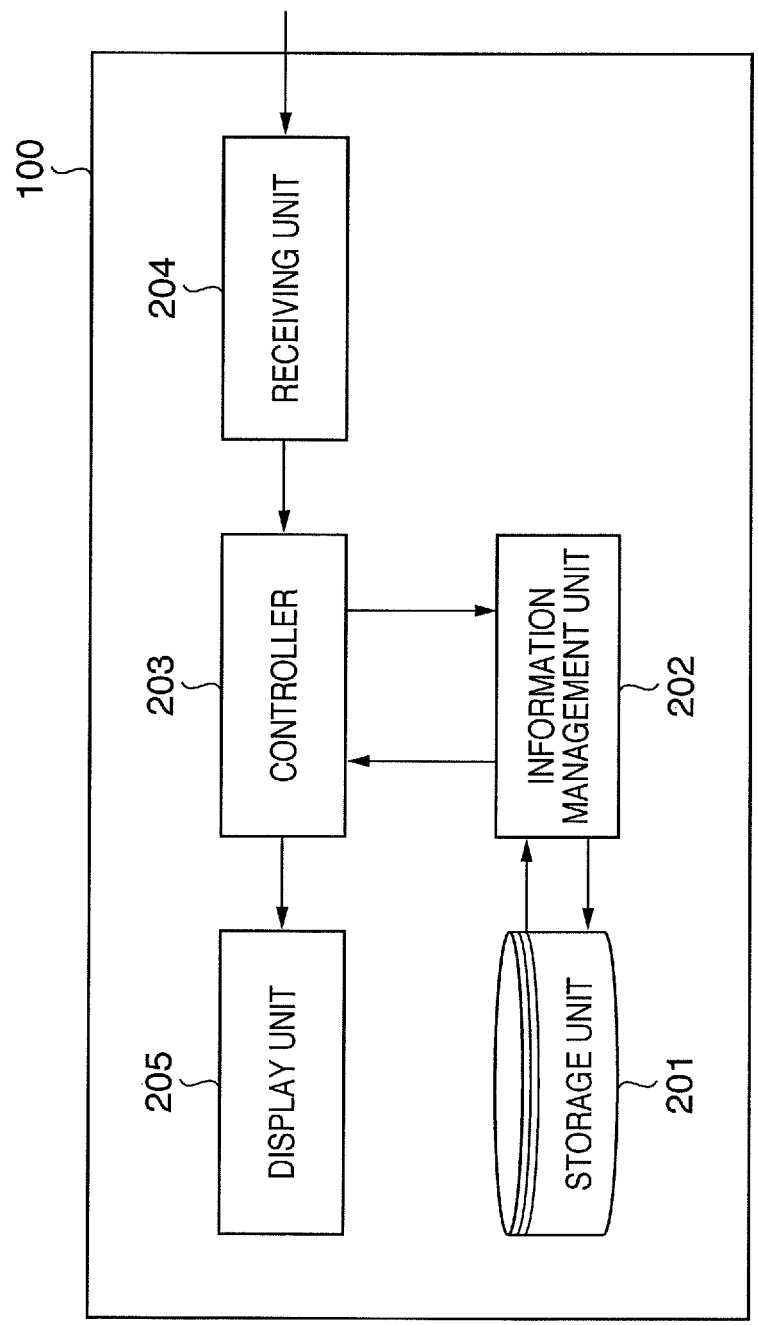
FIG. 2 is a functional block diagram of the information processing apparatus according to the first embodiment.

FIG. 2 is a functional block diagram of the information processing apparatus according to the first embodiment. The information processing apparatus 100 comprises functional units, namely a storage unit 201, an information management unit 202, a controller 203, a receiving unit 204 and a display unit 205.

The storage unit 201 is a functional unit which, in accordance with a request from the information management unit 202 (described later), stores drawing information and input window information presently being displayed. Specifically, when the CPU 101 executes the application program 107, the storage unit 201 is acquired in the memory 102 and storage device 103.

The information management unit 202 is a functional unit for manipulating and managing information stored in the storage unit 201. In accordance with a request from the controller 203 (described later), the information management unit 202 operates and manages the storage unit 201. Specifically, the information management unit 202 is implemented by the CPU 101 executing the application program 107.

The controller 203 is a functional unit which, in accordance with information received by the receiving unit 204, controls the execution of various functions possessed by the application program 107. The receiving unit 204 is a functional unit for receiving information that the user has entered by the digitizer 104a, etc., and reporting the information to the controller 203. The display unit 205 is a functional unit for displaying the results of executing various functions implemented by the controller 203 based upon information input by the receiving unit 204. Specifically, the display unit 205 comprises the display device 105.

<Operation of Apparatus>

Figure 3:
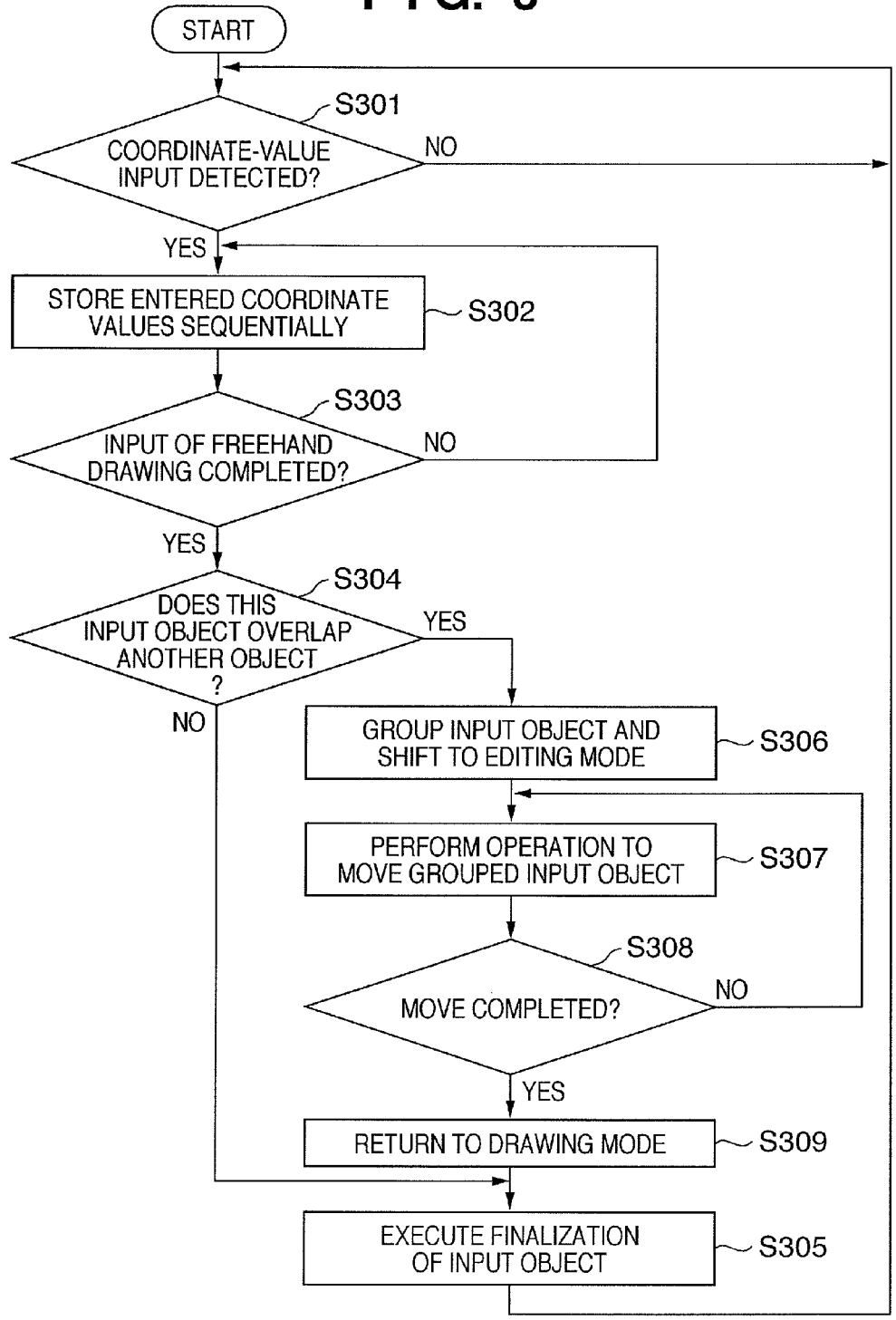
FIG. 3 is a flowchart illustrating operation of the information processing apparatus according to the first embodiment.

FIG. 3 is a flowchart illustrating operation of the information processing apparatus according to the first embodiment. In particular, the illustrated operation flowchart is that of processing executed when the information processing apparatus 100 is operating in the drawing mode and the user manipulates the pen 104b to input a freehand drawing by the digitizer 104a. Processing will be described below while referring to examples (FIGS. 4 to 9) of display screens at each of the steps of the flow of operation. Although expressions such as "ABCD" are used in the description that follows, in actuality these mean that character shapes are drawn as images by successive inputs of coordinate values.

Further, in the description that follows, a case where the digitizer 104a and pen 104b (also referred to as a stylus) primarily are used as the input device 104 will be described. However, a pointing device such as the mouse 104d capable of inputting coordinates will suffice. It will be assumed that the digitizer 104a outputs coordinate values to the receiving unit 204 periodically. The coordinate values correspond to a point at which the pen is pressed down upon the digitizer (also referred to as "pen down" below). In other words, in a case where the digitizer 104a is not being pressed down by the pen 104b (also referred to as T"pen up" below), a coordinate-value signal is not output to the receiving unit 204.

Figure 4:
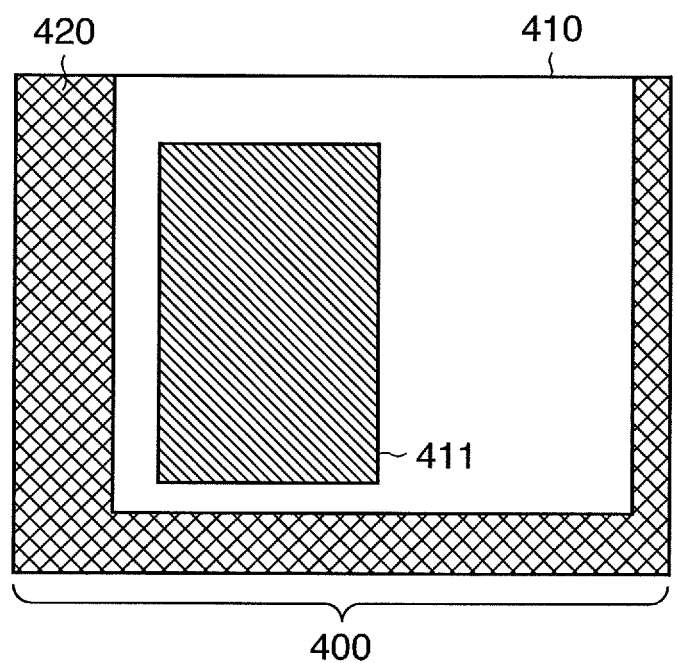
FIG. 4 is a diagram exemplifying a display screen of an application before the start of input of a freehand drawing.

FIG. 4 is a diagram exemplifying a display screen of an application before the start of input of a freehand drawing. The entirety of a display screen 400 is composed of areas 410 and 420. The area 420, which is indicated by crosshatching, is an area utilized in operating an application. For example, this area corresponds to a tool bar, slide bar or thumbnail display. Accordingly, the area 420 is one in which the user cannot draw. On the other hand, the area 410 is an area in which the user can draw. Here it is assumed that an object 411 indicated by shading has already been drawn. It should be noted that when the term "object" is used in this invention, it is assumed to cover the meaning of the drawing-prohibited area (area 420) as well.

At step S301 in FIG. 3, the controller 203 determines whether input of coordinate values to the receiving unit 204 by the digitizer 104a has started. Specifically, the controller 203 detects input of coordinate values to the receiving unit 204 by the pen-down operation of the pen 104b on the digitizer 104a by the user. If such an input is detected, control proceeds to step S302. If input is not detected, then step S301 is repeated until an input is detected.

At step S302, the controller 203 stores the coordinate-value information, which has been input to the receiving unit 204, in the storage unit 201 sequentially via the information management unit 202.

At step S303, the controller 203 determines whether pen-up has continued for more than a prescribed period of time (x seconds). If pen-up has continued for more than a prescribed period of time, then the controller 203 determines that input of the freehand drawing has been completed. Control proceeds to step S304. On the other hand, if pen-up ends within the prescribed period of time and coordinates have been input anew, control returns to step S302 and input continues.

At step S304, the controller 302 determines whether the freehand-drawing input object has a portion overlapping an already existing object. For example, the determination is made by checking whether one or more coordinate values stored at step S302 fall in the drawing-prohibited area (area 420) or already existing object (object 411).

Figure 5:
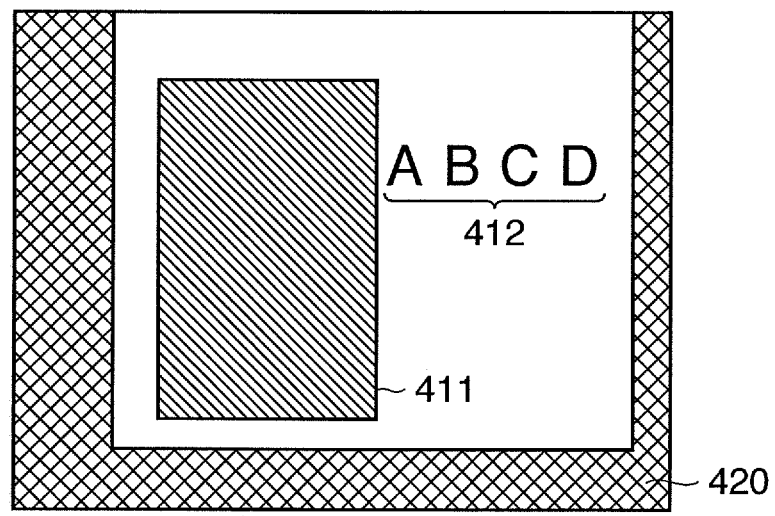
FIG. 5 is a diagram illustrating an example in which a freehand-drawing input object does not have a portion that overlaps a drawing-prohibited area.
Figure 6:
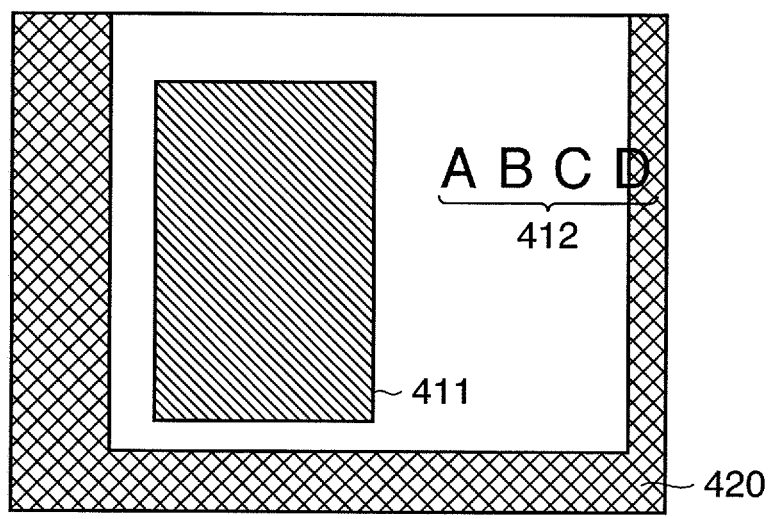
FIG. 6 is a diagram illustrating an example in which a freehand-drawing input object has a portion that overlaps a drawing-prohibited area.

FIG. 5 is a diagram illustrating an example in which a freehand-drawing input object 412 does not have a portion that overlaps the drawing-prohibited area 420. On the other hand, FIG. 6 is a diagram illustrating an example in which the freehand-drawing input object 412 has a portion that overlaps the drawing-prohibited area 420.

In a case where the freehand-drawing input object 412 ("ABCD") does not have a portion that overlaps the drawing-prohibited area 420 or the already existing object 411, as shown in FIG. 5, control proceeds to step S305. On the other hand, in a case where the freehand-drawing input object 412 ("ABCD") has a portion that overlaps the drawing-prohibited area 420 or the already existing object 411, as shown in FIG. 6, control proceeds to step S306.

At step S305, the controller 203 finalizes the input object in the state prevailing at step S304 or at step S309, which is described later. Specifically, the information that has been stored in the storage unit 201 is post-processed, such as by setting it as information of a new existing object, and the information stored in the storage unit 201 is discarded. Control then returns to step S301 and the start of new drawing is accepted.

At step S306, the controller 203 exercises control (grouping) in such a manner that the drawing-related information such as coordinates stored in the storage unit 201 from steps S301 to S303 is handled as one group. The information processing apparatus 100 is changed over to the editing mode with the grouped information in the selected state.

Figure 7:
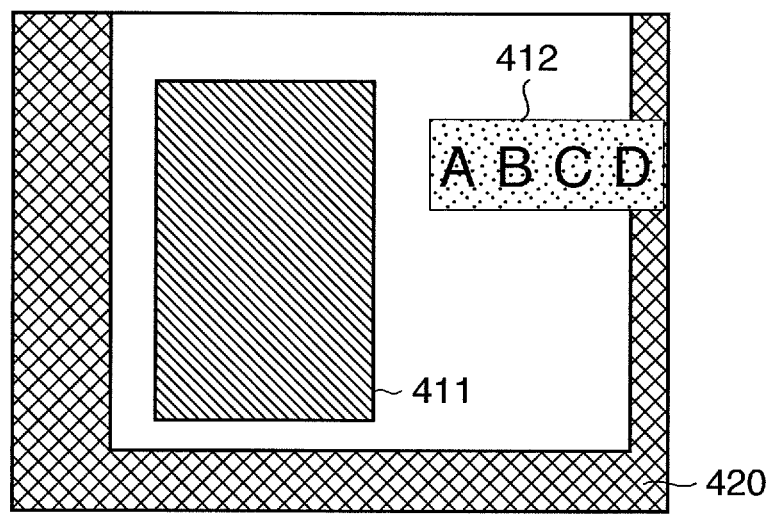
FIG. 7 is a diagram exemplifying a state in which a freehand-drawing input object has been grouped.
Figure 9:
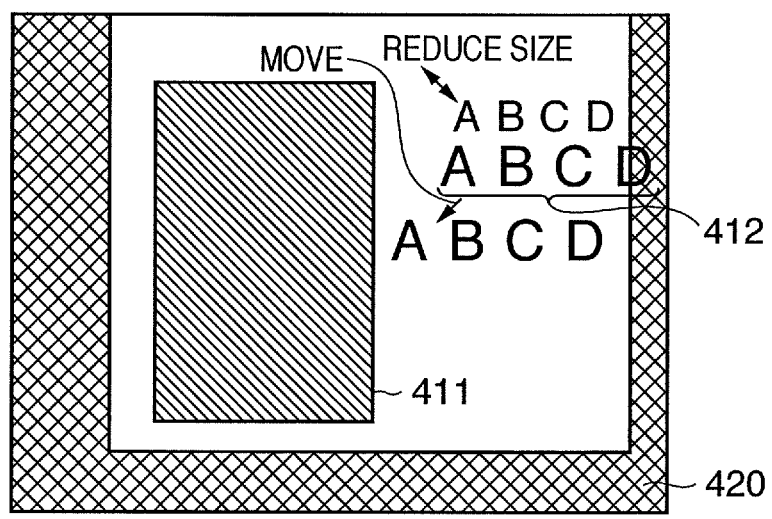
FIG. 9 is a diagram exemplifying a state in which a freehand-drawing input object is moved and reduced in size.

FIG. 7 is a diagram exemplifying a state in which a freehand-drawing input object has been grouped. This illustrates the result of the change in state in a case where object overlap has been determined in the state shown in FIG. 6. Here "ABCD", which is the freehand-drawing input object 412 that was drawn successively from steps S301 to S303, is grouped. The apparatus is switched to the editing mode in a state in which the grouped "ABCD" has been selected.

At step S307, the controller 203 exercises control to move "ABCD", which is the grouped freehand-drawing input object 412, to coordinates where it will not overlap the drawing-prohibited area 420 or already existing object 411. A position for which the freehand-drawing input object 412 will be moved the minimum distance may be calculated and decided upon as the destination position utilizing the coordinate values that have been stored in the storage unit 201.

It should be noted that besides the automatic movement described above, the freehand-drawing input object 412 in the selected state may be moved based upon movement of the pen 104b moved on the digitizer 104a by the user. At such time the state of movement of the pen 104b is accepted while the pen-down state of the pen 104b is continuing.

FIG. 8 is a diagram exemplifying a state in which the selected freehand-drawing input object 412 is being moved. This illustrates an example in which the freehand-drawing input object 412 is translated to the left so as not to have a portion that overlaps the area 420 overlapped in the state shown in FIG. 7.

At step S308, the controller 203 determines whether move processing has been completed. In a case where moving is processed automatically at step S307, processing is executed in conformity with this step. On the other hand, in a case where a user operation was accepted at step S307, the controller 203 determines whether the pen 104b has been raised (i.e., whether the pen-down state is no longer in effect). If it is determined that the pen has been raised, control proceeds to step S308. If it is determined that the pen has not been raised, step S307 is repeated until the pen is raised.

At step 8309, the controller 203 de-selects the freehand-drawing input object 412 that was grouped at step S304 and returns the information processing apparatus 100 to the drawing mode.

In accordance with the information processing apparatus 100 according to the first embodiment, as described above, whether there is overlap with the already existing object 411 is determined at completion of input of the freehand-drawing input object 412. If there is an overlapping portion, the freehand-drawing input object 412 can be moved automatically to a position at which there is no overlap with other objects or the like. This means that if overlap between objects occurs at the time of a presentation or the like, the overlapping state can be eliminated automatically or by a simple operation.

It has been described that an operation for moving the freehand-drawing input object 412 is accepted at step S307. However, it may be so arranged that a size-reducing operation (FIG. 9) performed by the user is accepted.

(Second Embodiment)
<Overview>

The second embodiment differs from the first embodiment in the processing executed in a case where a grouped freehand-drawing input has a portion overlapping another object or the like. Specifically, this embodiment eliminates overlap by adjusting the spacing between a plurality of "strokes" in an entered freehand drawing. It should be noted that the structure of the information processing apparatus in this embodiment is similar to that of the first embodiment and need not be described again.

<Operation of Apparatus>

Figure 11:
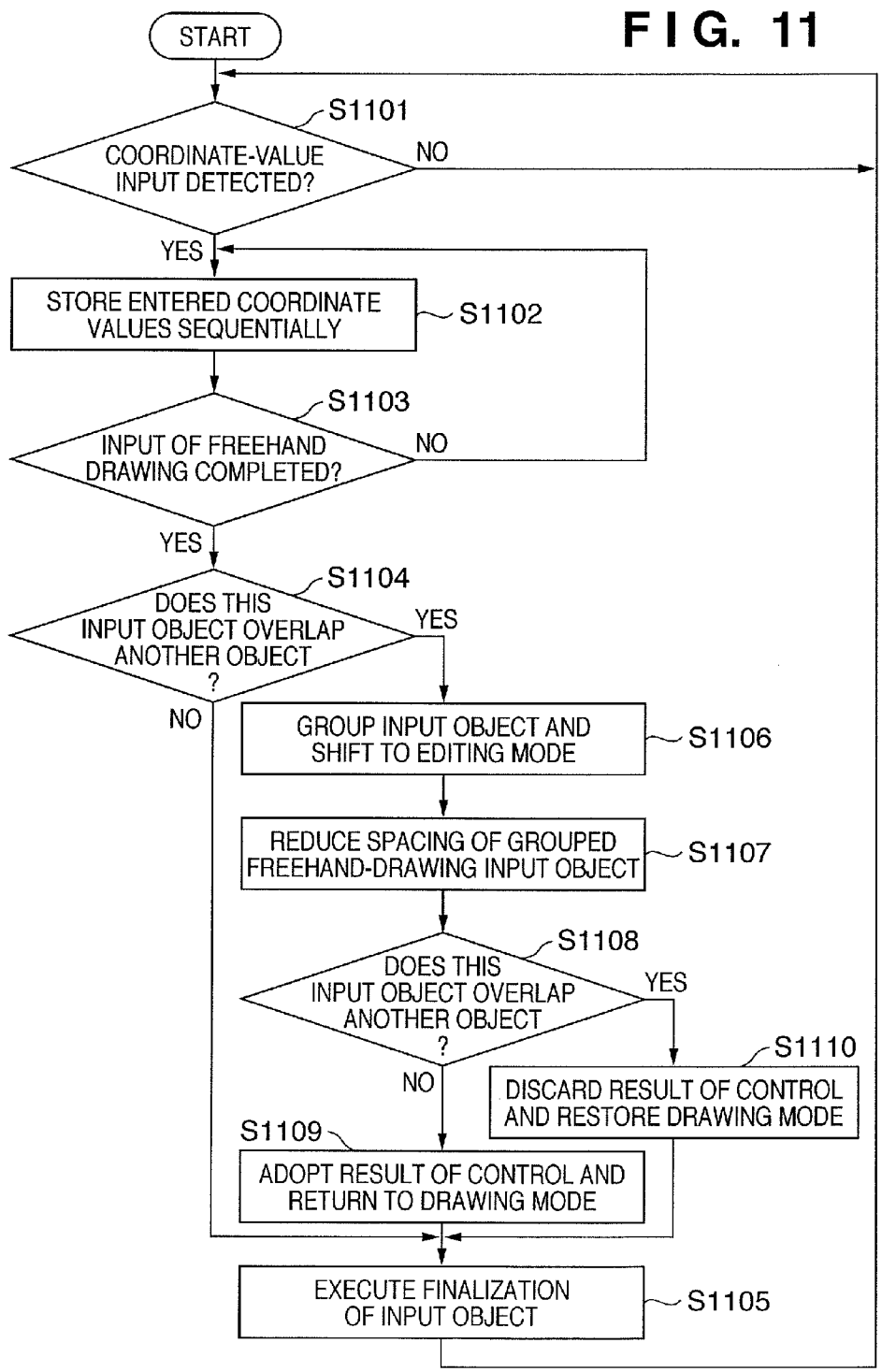
FIG. 11 is a flowchart illustrating operation of an information processing apparatus according to a second embodiment of the present invention.

FIG. 11 is a flowchart illustrating operation of the information processing apparatus according to the second embodiment. It should be noted that the display screen of the application will be described as one similar to that of the first embodiment (FIG. 4) before the start of input of a freehand drawing.

At step S1101 in FIG. 11, the controller 203 determines whether input of coordinate values to the receiving unit 204 by the digitizer 104a has started. Specifically, the controller 203 detects input of coordinate values to the receiving unit 204 by the pen-down operation of the pen 104b on the digitizer 104a by the user. If such an input is detected, control proceeds to step S1102. If input is not detected, then step S301 is repeated until an input is detected.

At step S1102, the controller 203 stores the coordinate-value information, which has been input to the receiving unit 204, in the storage unit 201 sequentially via the information management unit 202.

At step S1103, the controller 203 determines whether pen-up has continued for more than a prescribed period of time (x seconds). If pen-up has continued for more than a prescribed period of time, then the controller 203 determines that input of the freehand drawing has been completed. Control proceeds to step S1104. On the other hand, if pen-up ends within the prescribed period of time and coordinates have been input anew, control returns to step S1102 and input continues.

At step S1104, the controller 302 determines whether the freehand-drawing input object has a portion overlapping an already existing object. For example, the determination is made by checking whether one or more coordinate values stored at step S302 fall in the drawing-prohibited area (area 420) or already existing object (object 411).

In a case where the freehand-drawing input object 412 ("ABCD") does not have a portion that overlaps the drawing-prohibited area 420 or the already existing object 411, as shown in FIG. 5, control proceeds to step S1105. On the other hand, in a case where the freehand-drawing input object 412 ("ABCD") has a portion that overlaps the drawing-prohibited area 420 or the already existing object 411, as shown in FIG. 6, control proceeds to step S1106.

At step S1105, the controller 203 finalizes the input object in the state prevailing at step S1104 or at step S1109, which is described later. Specifically, the information that has been stored in the storage unit 201 is post-processed, such as by setting it as information of a new existing object, and the information stored in the storage unit 201 is discarded. Control then returns to step S1101 and the start of new drawing is accepted.

At step S1106, the controller 203 exercises control (grouping) in such a manner that the drawing-related information such as coordinates stored in the storage unit 201 from steps S1101 to S1103 is handled as one group. The information processing apparatus 100 is changed over to the editing mode with the grouped information in the selected state.

At step S1107, the controller 203 exercises control in such a manner that the spacing between "strokes" constituting "ABCD", which is the grouped freehand-drawing input object 412, is narrowed in the transverse direction of the drawing. Specifically, in the control carried out, the portion (character "A" in this case) opposite the overlapping portion (character "D" in this case) is held fixed, then the spacing between the "strokes" constructing the characters to the right of "A" is narrowed by a prescribed spacing. The prescribed spacing is a value that has been set in the controller 203 beforehand. This value is a spacing that will not result in distortion of the characters.

FIG. 12 is a diagram exemplifying a state in which the spacing between "strokes" constituting a freehand-drawing input object has been narrowed. This illustrates an example in which the controller 203 performs an operation to narrow spacing transversely of the drawing in such a manner that the freehand-drawing input object 412 will no longer have a portion that overlaps the area 420, which is overlapped by the object in the state shown in FIG. 6.

Figure 13:
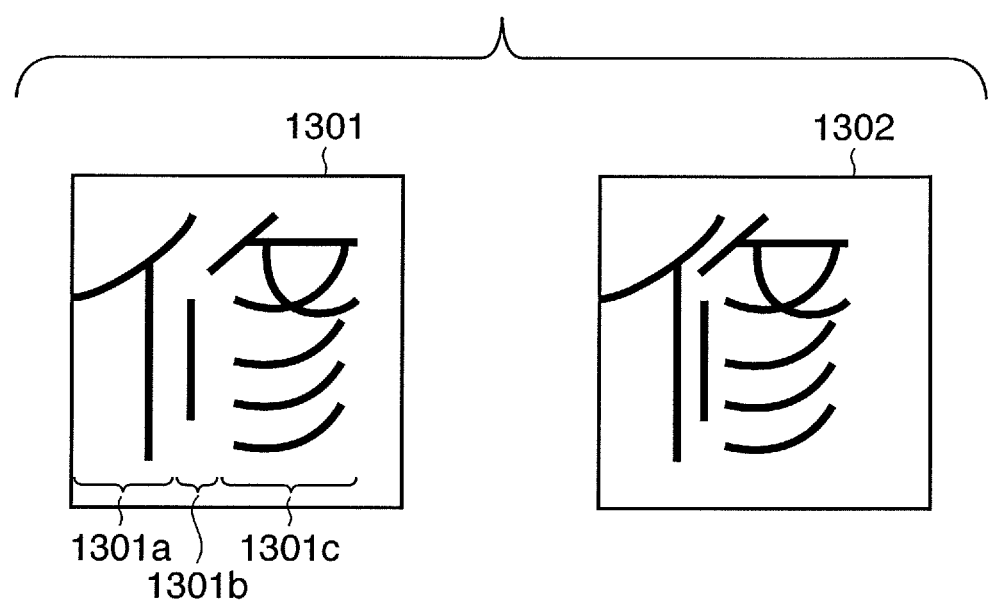
FIG. 13 is a diagram exemplifying states before and after spacing adjustment of a Chinese character, which is freehand-drawing input object.

FIG. 13 is a diagram exemplifying states before and after spacing adjustment of a freehand-drawing input object 1301. It should be noted that the freehand-drawing input object 1301 is a single character (a Chinese character), but it can be roughly divided into three parts (1301a to 1301c). The three parts are combined into. With a freehand input, a character cannot be recognized as an individual unit unless an operation to delimit the character is performed. For this reason, a freehand-drawing input object is handled as a collection of "strokes". With regard to a set of mutually intersecting "strokes" (1301a to 1301c), the intersecting strokes may be treated as a single stroke.

At step S1108, the controller 203 determines whether the freehand-drawing input object 412 after the stroke adjustment processing at step S1107 overlaps an already existing object of the like. If it is determined that there is no overlap with an already existing object or the like, control proceeds to step S1109. On the other hand, if it is determined that there is overlap (that overlap still remains), then control proceeds to step S1110.

At step S1109, the controller 203 adopts the result of the processing executed at step S1107. At step S1110, on the other hand, the controller 203 discards the result of the processing executed at step S1107. The drawing mode is then restored.

In accordance with the information processing apparatus 100 of the second embodiment, as described above, whether the freehand-drawing input object 412 overlaps the already existing object 411 is determined at completion of input of the object 412. If there is overlap, the spacing between the "strokes" of the characters constructing the freehand-drawing input object 412 is controlled automatically. As a result, it is possible to eliminate overlap automatically or through a simple operation even in a case where objects overlap each other at the time of a presentation or the like.

Further, since the freehand-drawing input object 412 can be reduced in size in one direction rather than in its entirety, a change in the size of the character can be suppressed. This means that when the user performs a continuous input, the user can perform this operation without being overly concerned with a change in the size of the characters.

(Modification)

The present invention may also be applied to a case where drawing is performed not in a single row but continuously with a change in drawing direction, as indicated by arrow 1400 in FIG. 14. In a case where it has been determined that the characters can be placed in a single row at this time by narrowing the spacing between drawn strokes, the control of step S1107 described above is executed to obtain the display shown in FIG. 12.

In the foregoing embodiments, as object that will interfere with the display of a freehand-drawing input object is assumed as the already existing object. However, an object that will not interfere with the display of a freehand-drawing input object directly, such as a transparent window, may be the already existing object.

Figure 15B:
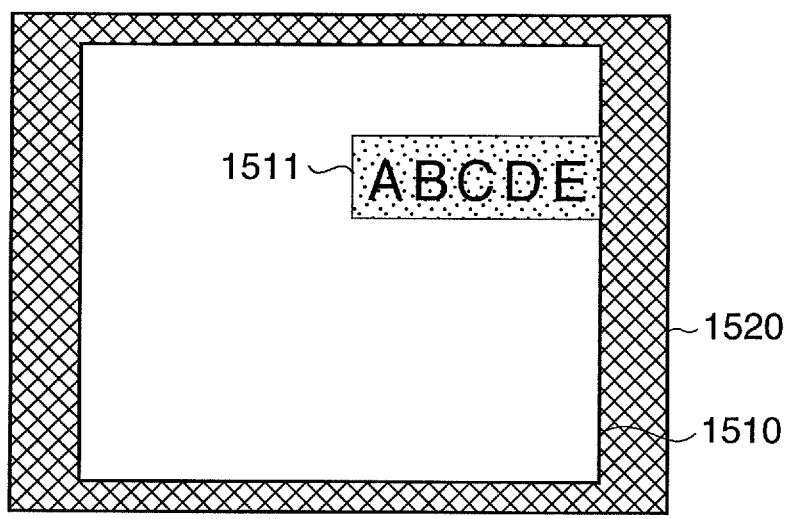

FIGS. 15A and 15B are diagrams illustrating an example of control in a case where a transparent window has been placed in front of a freehand drawing area. In FIG. 15A, an area 1510 is a write area and an area 1520 indicates an area corresponding to a transparent window. By applying the above-described control to a freehand-drawing input object 1511, it is possible to suppress display of this object in the area 1520, as illustrated in FIG. 15B.

Although the present invention has been described treating the freehand drawing area (window) and a window that displays this area as being of the same size, there is no problem even if these are different in size. FIGS. 16A and 16B are diagrams illustrating an example of a case where a freehand drawing window and a display window are different. A display screen shown in FIG. 16B logically has a layered structure of the kind shown in FIG. 16A, in which reference numerals 1630, 1610 and 1620 denote a transparent window capable of accepting an input, a display window and a display-prohibited area, respectively. When the user inputs a freehand-drawing input object 1611a to the transparent window 1630 and completion of this input is determined, the object is transferred to the display window 1610 as a freehand-drawing input object 1611b. If the freehand-drawing input object 1611b overlaps the display-prohibited area 1620 at this time, then move, size-reduction or narrowing control is carried out.

Figure 17A:
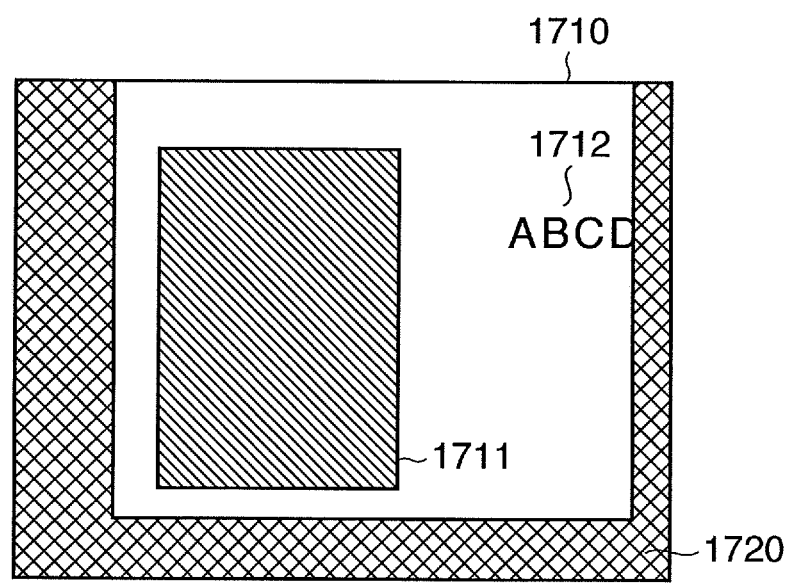
Figure 17C:
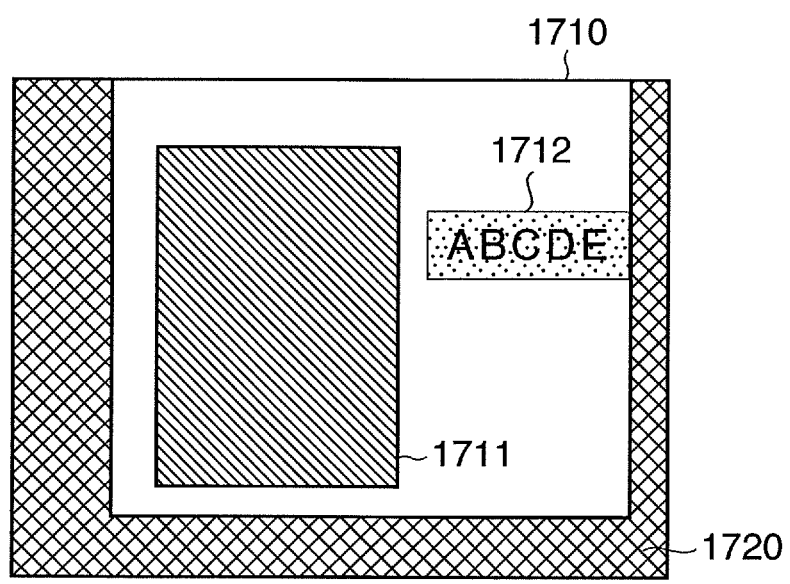

Alternatively, it is permissible to adopt an arrangement in which it is possible to change the in-front, in-back relationship between a freehand drawing window and another window although the change was not made at the time of an input. FIGS. 17A to 17C are diagrams exemplifying a change in the in-front, in-back relationship between windows at the time of input of a freehand drawing. When a freehand-drawing input object 1712 is being input in FIG. 17A, an area 1720 is moved in back temporarily when the input protrudes into the area 1720 (see FIG. 17B). Following completion of the freehand drawing, control is performed to restore the in-front, in-back relationship of the windows to the original state, and the freehand-drawing input object 1712 is subjected to move, size-reduction or narrowing control (see FIG. 17C).

(Other Embodiments)

Although embodiments of the present invention have been described above in detail, the present invention may be applied to a system constituted by a plurality of devices or to an apparatus comprising a single device.

Furthermore, the invention is attained also by supplying a program, which implements the functions of the foregoing embodiments, directly or remotely to a system or apparatus, reading the supplied program codes by the system or apparatus, and then executing the program codes. Accordingly, since the functional processing of the present invention is implemented by computer, the computer program per se installed on the computer falls within the technical scope of the present invention.

In this case, so long as the system or apparatus has the functions of the program, the form of the program, e.g., object code, a program executed by an interpreter or script data supplied to an operating system, etc., does not matter.

Examples of recording media that can be used for supplying the program are a floppy (registered trademark) disk, hard disk, optical disk (CD, DVD), magneto-optical disk, magnetic tape, non-volatile type memory card and ROM, etc.

Further, the above-described functions of the embodiments are implemented by a computer executing a read program. In addition, an operating system or the like running on the computer can perform all or a part of the actual processing based upon the instructions of the program so that the functions of the foregoing embodiments can be implemented by this processing.

Furthermore, the program code read from a recording medium is written to a memory provided on a function expansion board inserted into the computer or provided in a function expansion unit connected to the computer. Thereafter, a CPU or the like provided on the function expansion board or function expansion unit performs a part of or the entire actual process based upon the instructions of the program, and the functions of the above embodiments are implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-251413, filed Sep. 15, 2006, which is hereby incorporated by reference herein in its entirety.

What is claimed is:

1. An information processing apparatus comprising:
   a first determination unit configured to determine whether new coordinate data is input within a predetermined time since previous coordinate data for displaying an image on a display is input;
   a grouping unit configured to group the new coordinate data and the previous coordinate data as an object if said first determination unit determines that the new coordinate data is input within the predetermined time since the previous coordinate data for displaying the image on the display has been input;
   a second determination unit configured to determine whether the object which corresponds to the new coordinate data and the previous coordinate data, the object having been grouped by said grouping unit, overlaps with a predetermined area on the display; and
   a control unit configured to move the object corresponding to the new coordinate data and the previous coordinate data together to avoid overlapping with the predetermined area in a case where said second determination unit determines that the object overlaps with the predetermined area.

2. The information processing apparatus according to claim 1, wherein, if an overlapping portion remains after said control unit moves the object, said control unit discards the result of the movement of the object.

3. The information processing apparatus according to claim 1, wherein said control unit moves the object based upon operation of a coordinate input device by a user.

4. The information processing apparatus according to claim 1, wherein said second determination unit determines whether the predetermined time has passed since a pointing on the display by a pointing device has finished and whether the object which corresponds to the new coordinate data and the previous coordinate data overlaps with the predetermined area on the display.

5. The information processing apparatus according to claim 1, wherein the information processing apparatus is operable in a drawing mode for displaying a plurality of images on a display device based upon input coordinate data and in an editing mode for changing a display position of the plurality of images that has been displayed on the display device, and
   wherein said grouping unit groups the plurality of images in the object which corresponds to the new coordinate data and the previous coordinate data, and said control unit changes from the drawing mode to the editing mode in a case where said second determination unit determines that one or more of the plurality of images overlap with the predetermined area on the display.

6. The information processing apparatus according to claim 1, wherein the new coordinate data and the previous coordinate data are stored in a storage unit, and
   wherein the object is a selection of both the stored new coordinate data and the stored previous coordinate data as one group of coordinates.

7. A method of controlling an information processing apparatus comprising:
   a first determination step of determining whether new coordinate data is input within a predetermined time since previous coordinate data for displaying an image on a display is input;
   a grouping step of grouping the new coordinate data and the previous coordinate data as an object if it is determined in the first determination step that the new coordinate data is input within the predetermined time since the previous coordinate data for displaying the image on the display has been input;

a second determination step of determining whether the object which corresponds to the new coordinate data and the previous coordinate data, the object having been grouped by the grouping step, overlaps with a predetermined area on the display; and a control step of moving the object corresponding to the new coordinate data and the previous coordinate data together to avoid overlapping with the predetermined area in a case where it is determined by the second determination step that the object overlaps with the predetermined area.

8. A non-transitory computer-readable storage medium storing a program for causing the method of controlling the information processing apparatus set forth in claim 7 to be executed by a computer.

9. An information processing apparatus comprising:

a first determination unit configured to determine whether new coordinate data is input within a predetermined time since previous coordinate data for displaying an image on a display is input;

a grouping unit configured to group the new coordinate data and the previous coordinate data as an object if said first determination unit determines that the new coordinate data is input within the predetermined time since the previous coordinate data for displaying the image on the display has been input;

a second determination unit configured to determine whether the object which corresponds to the new coordinate data and the previous coordinate data, the object having been grouped by said grouping unit, overlaps with a predetermined area on the display; and one of:
  (a) a control unit configured to reduce a size of the object which corresponds to the new coordinate data and the previous coordinate data to avoid overlapping with the predetermined area in a case where said second determination unit determines that the object which corresponds to the new coordinate data and the previous coordinate data overlaps with the predetermined area,
  (b) a control unit configured to narrow in one direction a space for displaying the object which corresponds to the new coordinate data and the previous coordinate data to avoid overlapping with the predetermined area in a case where said second determination unit determines that the object which corresponds to the new coordinate data and the previous coordinate data overlaps with the predetermined area,
  (c) a control unit configured to change, if one or more of a plurality of images in the object which corresponds to the new coordinate data and the previous coordinate data overlaps a predetermined area on the display, a size of a part of the plurality of images, such that the plurality of images displayed on the display does not overlap the predetermined area on the display, and
  (d) a control unit configured to adjust, if the second determination unit determines that the object which corresponds to the new coordinate data and the previous coordinate data overlaps with the predetermined area, a spacing between a plurality of strokes in the object which corresponds to the new coordinate data and the previous coordinate data to avoid overlapping with the predetermined area.

10. The information processing apparatus according to claim 9, wherein the apparatus comprises the control unit recited in (a).

11. The information processing apparatus according to claim 9, wherein the apparatus comprises the control unit recited in (b).

12. The information processing apparatus according to claim 9, wherein the apparatus comprises the control unit recited in (c).

13. The information processing apparatus according to claim 9, comprising the control unit recited in (d).

14. A method of controlling an information processing apparatus, the method comprising:

a first determination step of determining whether new coordinate data is input within a predetermined time since previous coordinate data for displaying an image on a display is input;

a grouping step of grouping the new coordinate data and the previous coordinate data as an object if it is determined in the first determination step that the new coordinate data is input within the predetermined time since the previous coordinate data for displaying the image on the display has been input;

a second determination step of determining whether the object which corresponds to the new coordinate data and the previous coordinate data, the object having been grouped by said grouping step, overlaps with a predetermined area on the display; and one of:
  (a) a control step of reducing a size of the object which corresponds to the new coordinate data and the previous coordinate data to avoid overlapping with the predetermined area in a case where said second determination step determines that the object which corresponds to the new coordinate data and the previous coordinate data overlaps with the predetermined area,
  (b) a control step of narrowing in one direction a space for displaying the object which corresponds to the new coordinate data and the previous coordinate data to avoid overlapping with the predetermined area in a case where it is determined in the second determination step that the object which corresponds to the new coordinate data and the previous coordinate data overlaps with the predetermined area,
  (c) a control step of changing, if one or more of a plurality of images in the object which corresponds to the new coordinate data and the previous coordinate data overlaps the predetermined area on the display, a size of a part of the plurality of images, such that the plurality of images displayed on the display does not overlap the predetermined area on the display, and
  (d) a control step of adjusting, if the second determination step determines that the object which corresponds to the new coordinate data and the previous coordinate data overlaps with the predetermined area, a spacing between a plurality of strokes in the object which corresponds to the new coordinate data and the previous coordinate data to avoid overlapping with the predetermined area.

15. The method according to claim 14, comprising the control step recited in (b).

16. The method according to claim 14, comprising the control step recited in (c).

17. The method according to claim 14, comprising the control step recited in (a).

18. The method according to claim 14, comprising the control step recited in (d).

* * * * *